Figure 1:
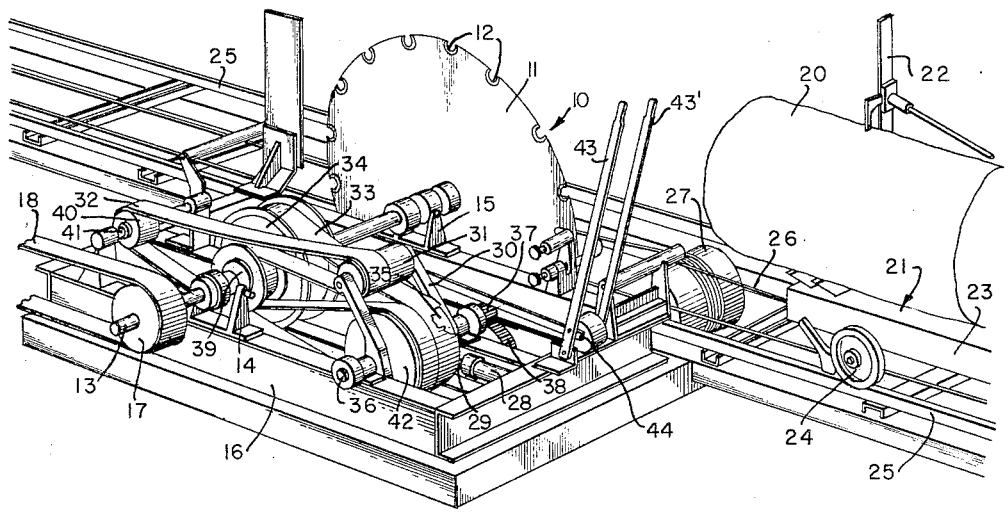

March 13, 1962  J. T. GRIFFIN  3,024,820
METHOD AND APPARATUS FOR PRODUCING LUMBER
Filed May 27, 1959  2 Sheets-Sheet 1

INVENTOR
J. T. GRIFFIN
BY
ATTORNEY

March 13, 1962     J. T. GRIFFIN     3,024,820
METHOD AND APPARATUS FOR PRODUCING LUMBER
Filed May 27, 1959     2 Sheets-Sheet 2
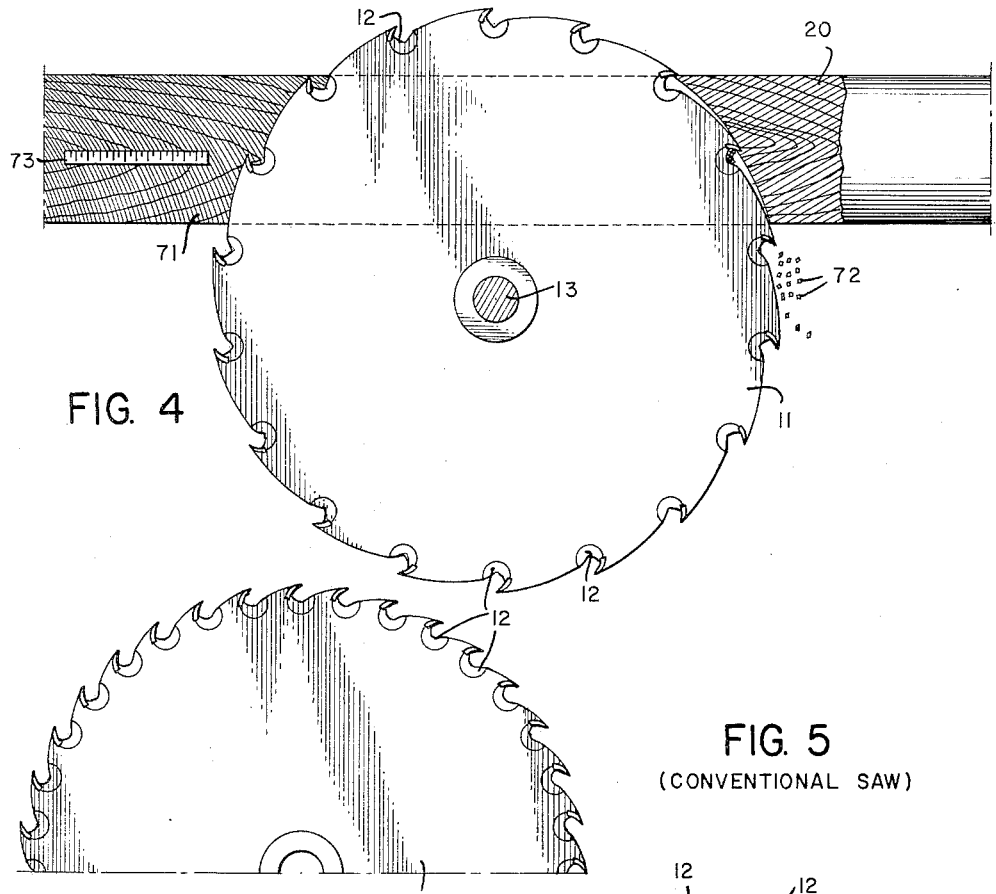
FIG. 4
FIG. 5
(CONVENTIONAL SAW)
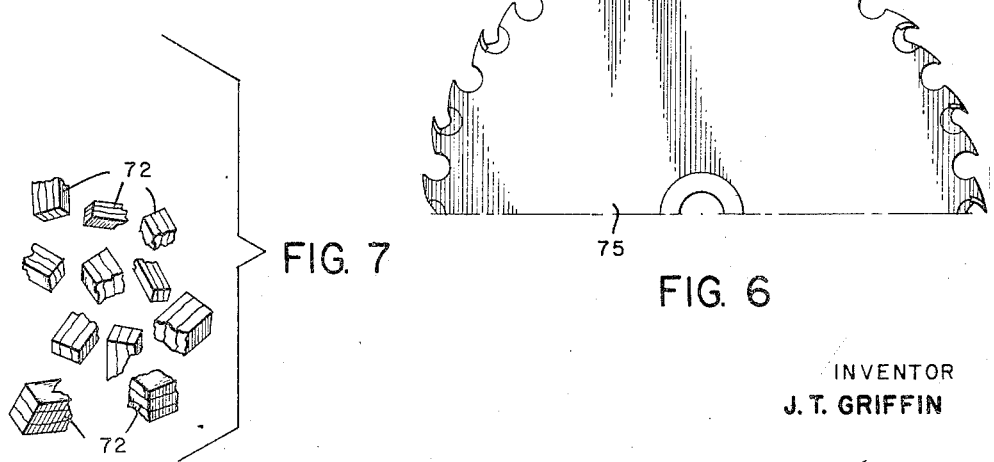
FIG. 7
FIG. 6
INVENTOR
J. T. GRIFFIN
BY _(signature)_
ATTORNEY 3,024,820
METHOD AND APPARATUS FOR PRODUCING LUMBER
John T. Griffin, Valdosta, Ga.
Filed May 27, 1959, Ser. No. 816,181
4 Claims. (Cl. 144—323)

This invention relates to the conservation and utilization of natural resources including the trees of the forest and to the production of lumber and cants by the sawing of such trees and with the resultant byproduct of small particles removed by the cut of the saw and referred to as sawdust.

The invention relates specifically to a method and apparatus for producing a greater yield with reduced waste and is a continuation-in-part of application Serial No. 685,848, filed September 24, 1957.

In the production of lumber from the trunks of trees or logs and using saws there has been a minimum amount of lumber and a maximum amount of waste in the form of sawdust with the waste of little or no value as can be observed from the piles of sawdust along the highways. The amount of lumber produced has been only about 55% or less and with about 15% of the total volume of the log waste in sawdust of which it was necessary to dispose. Approximately 10% of a log consists of bark and 20% of slabs, trimmings and edgings. These proportions vary in accordance with the diameter of the log and the size of the lumber produced, there being less waste in larger diameter logs. In other words, in the sawing of lumber approximately one log out of seven has been wasted in sawdust or about a ton of sawdust to 1000 board feet of lumber and this sawdust has had substantially no value since the particles were too small for commercial use such as for digestion and use in the manufacture of paper and other products. This has necessitated reducing logs to obtain larger wood particles or chips which could be digested and used in the production of paper, and has resulted in the depletion of forests due to the demand for lumber and for pulp instead of the use of the mountains of waste sawdust and of which it has been necessary to dispose. The fine sawdust heretofore produced has been composed of such particles that they were unsuitable for use as fibrous pulp in the manufacture of paper and other products because the fibers tended to clog the pulp mill apparatus and were not of sufficient strength to produce a strong matte.

In an effort to reduce waste in the manufacture of lumber from logs, slabs or outer portions of the debarked logs have been reduced to chips of a size useful for pulp and some mill operators have attempted to use thinner saw blades in order to reduce the size of the kerf and the amount of sawdust. However, this has had substantially no effect on reducing the amount of waste sawdust since it has not been possible usually to substantially reduce the size of the kerf due to increased operating problems accompanying the attempted use of thinner blades.

Although saw mills using circular saws are highly developed in their undertaking to utilize apparatus best suited for the preventing conditions including blade size with normal type teeth, speed of rotation and the amount of feed as well as the selection of blades and blade size in accordance with the size and type of logs and the man power and source of power available, nevertheless maximum profit from the saw mill has been relatively small because of the slow rate at which the logs could be fed with available personnel and the capacity of the equipment and the failure to obtain maximum board feet from logs and the minimum of unusable sawdust.

Efforts to solve problems pertaining to the mechanics of sawing have usually consisted of slowing down the ratio of the feed of the logs to the saws or by increasing the speed of rotation of the saws so that the bite or particle size removed by each tooth has been decreased, on the theory that the lead or strain on the saw thereby will be reduced.

Although it has been recognized that the production of larger particles of sawdust requires less total power, progress in this direction has been limited because of problems accompanying production of larger particles, such as the increased strain on the saw and the limited size of the gullets associated with the teeth. Also, saw blades usually are hammered or manufactured for operation at a predetermined speed and thereby are limited in their conditions of use, particularly in head sawing when it has been the practice for the operator feeding the logs to vary the feed rate in proportion to the diameter of the log, its toughness, and the ability of the saw to cut, the usual practice being for the operator to slow the feed rate for more difficult conditions and resulting in the teeth producing finer sawdust particles.

It is an object of the present invention to provide both method and apparatus for sawing logs to produce lumber and in which the wood or sawdust particles are larger than heretofore and of sufficient size and configuration for use in the production of satisfactory pulp for use in the manufacture of other commodities such as paper.

Another object is to produce such wood or sawdust particles which are of substantially uniform size and configuration that they readily are usable in the manufacture of paper pulp, boards of particles of compressed fiber, as well as other products from a cellulosic material.

A further object is to provide a method and apparatus for utilizing a greater portion of logs in the manufacture of acceptable products than has therefore been possible, in order to conserve our natural resources and improve the economy and welfare of those associated with the utilization of products of the forests.

Figure 2:
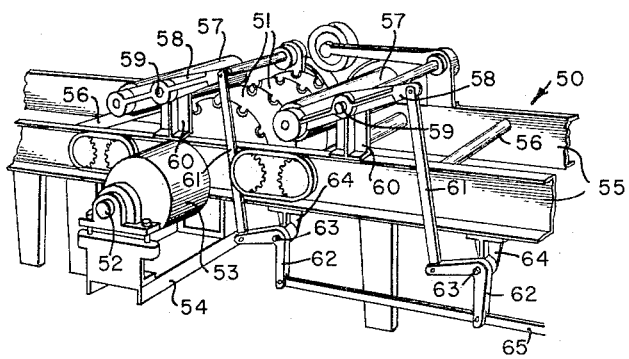
Figure 3:
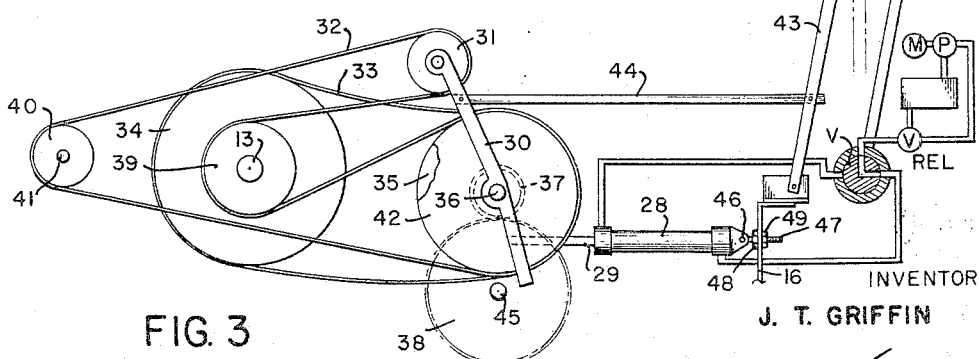

These and other objects and advantages of the invention will become apparent from the following description in conjunction with the accompanying drawings, wherein:

FIG. 1 is a perspective of a head saw illustrating one application of the invention;

FIG. 2, a perspective of an edger illustrating another application of the invention;

FIG. 3, a diagrammatic view of the driving mechanism for the log carrier or conveyor;

FIG. 4, an enlarged side elevation of a saw blade cutting a log, with the latter partly in section, and illustrating one method of determining the size of the saw chips;

FIG. 5, a fragmentary side elevation of a conventional blade;

FIG. 6, a fragmentary side elevation of a conventional blade modified in accordance with the invention; and FIG. 7, an enlarged perspective of several illustrative saw chips produced in accordance with the present invention.

The present invention provides for the sawing of logs and cants in such a way that wood particles are produced of a size and character acceptable for pulp and other cellulosic base products. This may be accomplished in various ways, such as by increasing the amount of the bite each tooth makes. This can be done by varying one or a combination of factors which determine the lengthwise bite size. Theoretically, this may be obtained either by increasing the feed rate, or decreasing the number of cutting teeth in the saw, or decreasing the speed of rotation of the saw, or a combination of these factors.

It is the usual practice in circular head sawing to use a variable speed feed, the rate of which the operator varies or adjusts in accordance with the nature of the log or cant being cut. When more difficult conditions are met, such as knots, it is the practice to slow the feed, with the result that the teeth take a smaller bite. Such variable speed feeds may be of the belt driven friction type, the steam, air, or hydraulic piston type, or a transmission clutch type driven from a suitable source of power.

With regard to the number of teeth, circular saw design has become standardized on a relatively small number of tooth patterns and the number of teeth on a saw of given size. The teeth in such saws substantially or entirely fill the rim, the theory apparently being that it is desirable to provide the maximum number of teeth for chipping away at a kerf. In order to utilize the saw teeth to the maximum advantage and permit a relatively fast feed rate, head saws have been run at a relatively fast rate of, say, 500 to 750 r.p.m., while edgers have usually run at approximately 1500-3000 r.p.m.

According to the present invention, feed rates may be selected to yield the production presently obtainable, in order to permit present production levels to continue, if desired, but the number of teeth and saw speed unobviously may be decreased even though a constant feed rate is used, and which is contrary to industry-wide practices and to what may be expected.

In any saw mill the production from the head saw is proportioned to the capacity of the succeeding saws, such as edgers, and the number of workmen available. Thus, to change the average feed rate at the head saw may be undesirable in many installations. It may, however, be desirable to change the existing feed apparatus to permit continued operation at a constant or substantially constant rate of feed to obtain wood particles or chips of substantially uniform length and size. Various methods of accomplishing this will be hereinafter described.

Due to the high rates of revolution at which circular saws operate, it has been the practice in head saws to hammer these to make them sufficiently flexible when at rest so that upon being rotated at the designed speed a saw may expand without rippling or otherwise experiencing distortion. Due to the relative flexibility or lack of stiffness, such saws have been limited in their ability to withstand difficult cutting conditions, such as through knots, frozen wood and the like. The use of slower saw speeds to permit the use of a stiffer saw has been regarded as undesirable because of requiring the teeth to take larger bites, thus putting more load on each tooth, contrary to accepted saw practice.

Because of the high speed and the flexible nature of conventional saws, the risk of their overheating has been magnified, since friction resulting from high speed more quickly produces overheating and since flexibility of the saw makes it more susceptible to running out of line and the like, which is aggravated by the still greater flexibility at higher temperatures.

The present invention contemplates the possibility of rotating the saw at a slower rate in order to obtain larger saw chip particles than were previously obtainable. Even though the load on the individual teeth may be greater than that encountered in conventional practice, the slower speed permits the use of a stiffer saw better able to withstand adverse sawing conditions such as knots or other obstacles. Furthermore, since the frictional heat produced at lower speeds is less than that at higher rates, the saw maintains its stiffness better and heats less rapidly even under extreme conditions. As a result, constant feed, and higher feed rates may be employed.

In view of the fact that the taking of larger bites by the individual teeth fills a larger portion of the gullet than if smaller bites are taken, it is necessary to consider gullet size in determining the final design and operation of the saw mill. Overfilling of a saw gullet causes the saw to jam in the kerf and thereby lose its ability to cut. Such condition is manifested by the saw's stalling or tearing the lumber. The volume of solid wood which may be cut by a tooth and retained without overfilling depends on the size of the gullet, and related factors including ability of the wood to be compressed, spillage from the gullet, and the clearance between the saw plate and the kerf. Factors such as compressibility obviously depend on the nature of the wood being cut. For mills using relatively small logs, such as east coast pine in which the width of face cut is approximately 12 inches or less, or in edgers sawing cants of similar size, it is possible to use the larger standard tooth forms for bits of approximately ¼ inch. This assumes that the volume of the solid wood removed may approximately equal the volume of the gullet, which is true for commonly used east coast pine. For cutting larger logs or cants, or for larger bites, or for wood of substantially lower compressibility, it is necessary to employ proportionately larger gullets if the size of bite is maintained.

In order to determine what will be required to practice the invention in an existing saw mill, one approach is to determine the length of bite which may be obtained by the apparatus presently in use. This may be obtained by measuring the maximum axial length between tooth marks on a cut board or cant. Theoretically this may be determined by the formula $B = 12F/T \times \text{r.p.m.}$, in which B is the length of bite per tooth in inches; F the feed in feet of lumber per minute; T the number of cutting teeth of the circular saw, and r.p.m. is the speed of revolutions per minute of the saw.

As an example, assuming a constant feed of 200 feet per minute with a saw having 48 teeth, operated at 600 r.p.m., it is calculated that the bite is one-twelfth of an inch. Assuming that the operator desires to continue operation at the same average running feed rate, it is obvious that he must vary the number of teeth of the saw or its speed or a combination in order to obtain a chip of the desired size. If we assume that a chip of ¼ inch is desired, we determine that this may be obtained in various ways. For example, the saw may be operated with 24 instead of 48 teeth and at a speed of 400 instead of 600 r.p.m., thus operating with half as many teeth in a saw this size (a 48-inch saw of conventional design will accommodate this number of teeth).

During operation of the mill the operator may check the size of the particles being produced from time to time by occasionally measuring the distance between saw cuts along the boards or cants, as well as by inspection of the particles.

For new mills, the operator may select a feed rate designed to utilize to the maximum extent the equipment and personnel employed and select saws with the number of teeth and designed for operation at the selected speed which will produce particles of the desired size.

If the operator desires to produce chips of one-quarter inch or larger, he may design his mill to produce chips of five-sixteenths in order to permit the operator some leeway in the rate of feeding, if desirable. As another example, if chips of 5/16 inch are preferred but as short as 3/16 inch are permissible, the feed may be set to operate constantly to produce the larger size and have provision for reduction in rate just sufficient to produce the smaller size, in order to allow for adverse cutting conditions such as extremely large knots, unusually tough wood, or logs of excessive diameter.

With respect to the feed rate, in order to produce chips of uniform size various apparatus for producing a constant feed may be used. For example, in a multiple-cut head saw where the log is run past the saw only once, the logs may be moved by a positively driven chain having spaced cleats. While it may be possible in a conventional variable speed feed apparatus to operate the same at a substantially constant speed, due to human error or fatigue constant feed operation may not be obtainable continuously in practice. Therefore, it may be desirable to modify such apparatus to facilitate constant feed operation. Various means of modifying or augmenting such apparatus to insure continuous constant feed may be employed. For example, in the conventional type of friction belt driven carriage the operating lever may be connected to an air piston or the like which moves the lever to its position in which the drive belt is fully engaged. In order to permit the operator to occasionally decrease the feed rate under unusual conditions, the feed lever may be connected to the operating means in such a way that it may be manually operated. Wood particles that are below the size requirement specified may be removed by screening.

With continued reference to the drawings, a saw mill embodying the present invention may comprise a head saw 10 having a blade 11 with teeth 12 of the conventional insert type. The teeth 12 are spaced at greater intervals than on conventional saws and the blade is driven at a constant rate of speed by a shaft 13 mounted in bearings 14 and 15 on a base 16. The shaft 13 is driven by a pulley 17 rotated by a belt 18 from a source of power, not shown.

In order to produce chips of a predetermined size, the log must be fed at a substantially constant rate of speed. The log 20 is carried on a conventional log conveyor or carrier 21 by holders 22 mounted on a carriage 23 having wheels 24 operable on tracks 25. A cable 26 is attached to the rear end of the carriage 23 and extends beneath the carriage and forwardly thereof to a drum 27 around which it is coiled several times and then extends around a pulley not shown at the remote end of the saw mill bed (FIG. 1) then back around a pulley, not shown, at the near end of such bed and is then attached to the carriage 23, so that the carriage may be moved in either direction.

Log 20 is fed into the head saw 10 until the blade 11 completes cutting a slab from one side whereupon the carriage 23 is reversed and returned to its starting position. The log is rotated or shifted over to the next position, and the carriage again moved forwardly.

In order to facilitate constant speed feed of the carriage apparatus for operating the feed lever to fully engaged position of the belt may be employed. Such apparatus may consist of a hydraulic or pneumatic cylinder 28 having piston 29 attached to a yoke 30 and such yoke is adapted to support a roller 31 which frictionally engages either belt 32 or 33.

The belt 32 is driven from a pulley 39 mounted on the shaft 13 and such belt extends about the roller 31, a pulley 40 on a shaft 41 and about a pulley 42 on a shaft 36 to drive a pinion gear 37, gear 38, and the drum 27 in a forward direction.

The pinion 37 is mounted on one end of shaft 36 and drives gear 38 carried on a shaft 45 on which the drum 27 is mounted, thus causing rotation of such drum which moves the carriage.

When it is desired to move the carriage forwardly so that the log is brought into contact with the cutting blade the piston 29 is extended from the cylinder 28 and roller 31 bears against the belt 32 to tighten such belt around the pulleys 31, 39, 40 and 42. When the slab has been cut from the log an operator may reverse the movement of the drum 27 and return the carriage to its starting position by causing the piston 29 to be retracted within the cylinder 28 to move the yoke 30 to its lower position in which the roller 31 bears against the belt 33 to tighten the belt between pulley 34 on shaft 13 and pulley 35 on shaft 36.

Operation of the cylinder 28 is preferably controlled by movement of a lever 43'. Movement of the lever 43' toward the operator operates a selective fluid valve V which in a first position F causes the piston 29 to extend from its cylinder. Similarly, upon reverse movement to a second position R the valve causes retraction of the cylinder. Intermediate the two positions is a neutral position N in which the piston is not actuated by the cylinder and is approximately midway of its stroke.

In the event that the fluid operating mechanism is not operating or if manual operation is desired because of adverse cutting conditions, the operator may place the valve in neutral position and manually move lever 43 which is connected by link 44 to the yoke 30. In order to accommodate contraction and expansion of the belts means for adjusting the stroke of the piston is desirable. This may consist of mounting the cylinder on a pivot 46 carried by an eyebolt 47 passing through base 16 and adjustably held by nuts 48, 49.

After the sides have been trimmed from the log, the log is then sawed into cants by the head saw and these are then placed on an edger saw 50 having a plurality of blades 51 which are spaced to cut boards of desired width. The blades are mounted on a shaft 52 driven by a motor 53 supported by a stand 54.

The edger comprises a pair of spaced parallel side members 55 with a plurality of rollers 56 therebetween so that the boards may be moved into contact with the saw blade 51. In order to hold down the cants or boards as they are being cut, a pair of upper rollers 57 are mounted on arms 58 pivotally mounted on shafts 59 carried by an upright support member 60. The free ends of the arms 58 are connected by links 61 to bell cranks 62 which are mounted on pivots 63 carried by depending support members 64 connected to the parallel side members 55. The lower ends of the bell cranks 62 are connected to a link 65 which is movably mounted to vary the height of the rollers 57.

The edger thus far described is conventional and operates with a constant rate of feed. Resawers, similar in construction to edgers are used in some mills. In order to obtain acceptable saw chips as a byproduct of the manufacture of lumber in such edgers and resawers, it is necessary to adjust the feed rate, the number of teeth, or the speed of rotation, or a combination, as previously described.

A conventional head saw blade 70, illustrated in FIG. 5, is provided with conventional spaced teeth, for example thirty six.

In the blade 11 the number of teeth has been reduced to 18 and the revolutions per minute of the saw blade as well as the movement of the carriage remain constant. It will be apparent from FIG. 4 that the tooth marks 71 are substantially equally spaced and the size of the chips 72 may be determined by placing a ruler or other measuring means 73 across the tooth marks 71.

If desired, the conventional saw blade 75 (FIG. 6) may be modified for use in a saw mill of the present invention by changing certain of its characteristics, one of which includes reducing the number of teeth so that the cutting teeth are equally spaced in accordance with the present invention and the revolutions per minute of such blade as well as the speed of the carrier are made constant.

It will be apparent that a saw mill is provided in which the saw blade is rotated at a constant speed, the log is moved against such blade at a constant speed and the teeth of the blade are spaced at greater intervals whereby substantially the same amount of work may be accomplished and the chips will be of sufficient size that they will be useful and no longer a waste product.

As previously described, although the present invention contemplates the use of constant feeds in order to produce saw chips of selected and uniform size, it may be desirable to permit the feeds to be manually controlled to accommodate adverse or unusual conditions. For example, the saw mill equipment including gullet size of the teeth may be selected for the bulk of the logs commonly handled. In the case of a small percentage of logs of excessive size, the feed may be reduced to permit such logs to be sawed, even though the chips are of smaller size.

It is understood that the present invention is applicable to all circular saws whether operated singly or in multiple which cut lengthwise of the log or cant, such saws commonly being known as head saws, resawers, and edgers. Furthermore, that the invention may be practiced with the log or cant passing either above the mandrel, or below the same as illustrated in application Serial No. 685,848.

As has been stated, wood particles or chips of sufficient size and character for pulp chips may be produced as an incident to the manufacture of acceptable lumber in saw mill operations. The requirements for pulp mills vary in accordance with the product manufactured but it has been found that for many purposes wood particles having a dimension lengthwise of the log of approximately one-quarter inch are satisfactory. For certain purposes a lesser length may be used and in certain others a particle slightly longer may be preferred.

The long history of saw mill practice has included restricted rate variable feed controlled by the operator, high speed saw revolution, a large number of teeth substantially filling the periphery of the saw, and the meeting of adverse sawing conditions by decreasing the feed rate, all contributing to the production of fine saw dust. The present invention, on the contrary, while adapted to utilize in many instances most of the existing saw mill equipment, includes a constant feed rate, which may be greater than the maximum previously used, if desired, the same being possible because the saw itself is able to stand up under adverse conditions commonly met due to its inherent stiffness as a result of being manufactured for a slower rate of revolution and the lessening of frictional heat generated at such lower rate. By decreasing the number of cutting teeth and providing the other characteristics including tensioning of the saw, the larger wood particles or chips are cut with fewer cuts made, with the total power requirements for operating the saw decreased.

In the practice of my invention the faces of the cut boards and cants may not be as smooth as those resulting from conventional saw mill operation but the roughness is removed in accordance with conventional planing practice without the necessity for removing any additional material over that which is commonly removed.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. The method of converting an existing sawmill wherein logs are fed to a rotating saw blade which produces sawdust to produce uniform saw particles substantially larger than those heretofore produced, comprising substantially decreasing the number of cutting chisels in the saw, substantially decreasing the rate of rotation of the saw, and feeding the log to the saw at a substantially constant rate in which the feed rate in feet per minute is approximately $\frac{1}{48}$ of the number of tooth bites per minute taken by the saw in order to produce saw particles of approximately one-quarter inch in length.

2. In the circular sawing of logs and cants into cants and boards, respectively, by advancing the same longitudinally against a rotating circular saw of a diameter appropriate for cutting the logs or cants and having a multiplicity of substantially evenly spaced teeth on its periphery, the improvement comprising using a saw having its teeth spaced apart a sufficient distance to cause such teeth to make substantially spaced cuts through the log or cant when the saw is rotated at a predetermined operable running speed against a log or cant fed at a predetermined operable feed rate, rotating the saw at a substantially constant speed, and advancing the logs and cants longitudinally against the teeth of the saw at a substantially constant feed rate, said feed rate, the number of teeth and the speed of the saw's rotation being selected and so related to each other that each tooth in each of its passes through the log or cant makes a cut of substantially uniform length longitudinally of the log or cant and approximately one quarter inch in advance of the cut made by the next preceding tooth in a direction longitudinally of the log or cant.

3. The method of producing saw chips having a length along the grain of approximately one-quarter inch, comprising feeding the log longitudinally into a revolving circular saw having a plurality of spaced teeth on its periphery at a substantially constant rate in which the feed rate in feet per minute is approximately one forty-eighth of the number of tooth bites per minute taken by the saw.

4. The method of sawing logs into usable boards and during the sawing operation forming chips of sufficient length along the longitudinal grain to be useful for making wood pulp, comprising providing teeth on a saw blade in spaced relation along the cutting periphery of the saw blade so that the teeth cut in succession, causing said saw blade to move at a selected peripheral speed and simultaneously with the operation of the saw at the selected peripheral speed positively feeding the log to the saw in a direction in the plane of the saw at such a rate of feed with relation to the peripheral speed of the cutting teeth of the saw blade as to permit each tooth to make a cut along the longitudinal grain of the log so that the next succeeding tooth makes a further cut of approximately one-quarter inch spaced along the longitudinal grain, thereby producing usable chips of approximately one-quarter inch in length.

References Cited in the file of this patent

UNITED STATES PATENTS

| | | |
|---|---|---|
| 124,142 | Lane | Feb. 27, 1872 |
| 475,881 | Merrill | May 31, 1892 |
| 489,988 | Schroeder | Jan. 17, 1893 |
| 867,980 | Krieger | Oct. 15, 1907 |
| 1,449,862 | Krohn | Mar. 27, 1923 |
| 1,672,893 | Kurtz | June 12, 1928 |
| 1,716,976 | Prentice | June 11, 1929 |
| 1,938,108 | Morris | Dec. 5, 1933 |
| 2,559,355 | Grupp | July 3, 1951 |
| 2,569,842 | Zweifel et al. | Oct. 2, 1951 |
| 2,655,189 | Clark | Oct. 13, 1953 |
| 2,751,947 | Wyss | June 26, 1956 |
| 2,776,687 | Clark | Jan. 8, 1957 |
| 2,811,183 | Mottet | Oct. 29, 1957 |
| 2,884,031 | Standal | Apr. 28, 1959 |
| 2,898,958 | Schubert | Aug. 11, 1959 |
| 2,899,992 | Key | Aug. 18, 1959 |